UNITED STATES PATENT OFFICE.

JAMES MILLAR NEIL, OF TORONTO, ONTARIO, CANADA, ASSIGNOR TO ALEXANDER M. HAY, OF TORONTO, CANADA.

BINDING OR CEMENTING MATERIAL.

1,023,674. Specification of Letters Patent. Patented Apr. 16, 1912.

No Drawing. Application filed May 27, 1911. Serial No. 629,815.

*To all whom it may concern:*

Be it known that I, JAMES M. NEIL, of Toronto, in the county of York and Province of Ontario, Canada, have invented certain new and useful Improvements in Binding or Cementing Material; and I hereby declare that the following is a full, clear, and exact description thereof.

This invention is a binder or cementing material for use in the manufacture of composite building material in all classes of construction work.

In another application filed May 27, 1911, Serial No. 629,813, I have disclosed a binder consisting of a mixture obtained from silicate of soda and an alkali, and from trisaccharate of lime and an acid radical salt.

I have discovered that by employing an agent, such as acetate of lime, in combination with silicate of soda I obtain a binder which when mixed with a suitable filler, of lime or limestone and sand, gravel, etc., will result in the production of silicate of calcium and the consequent binding of all the materials into a compact mass of great strength and durability.

Commercial silicate of soda is a thick syrupy mass; but if evaporated to dryness becomes practically insoluble in water, and requires prolonged boiling in a strong alkali in order to bring it into solution.

Such novel binder forms the subject-matter of the present application. It can be produced in the form of a solution; or in the form of powder; which latter is preferred as it can be more readily transported to the place where the binder is to be used, and results in greater economy of operation and facilitates its use.

If it is desired to use the elements of my novel binder in a wet or liquid form, I add to the commercial silicate of soda (*i. e.* the syrupy mass) sufficient water to dilute same to 30 to 50 degrees Twaddell; and then I make a solution (preferably 10% strength) of acetate of lime. Then I add preferably one part of such solution to five parts of the silicate of soda solution; and mix same with the filler.

I take an alkali (such as soda ash) and mix same with silicate of soda in the liquid form in which it is usually sold in commerce, and then evaporate the mixture, the resultant product is a dry soluble compound. For example the addition of about ten (10) parts of soda ash to ninety (90) parts of liquid silicate of soda on evaporation to dryness produces a soluble compound of silicate of soda.

To produce my novel binder in a dry state I preferably add one part of acetate of lime in a dry state to five parts of the dry soluble compound of silicate of soda above mentioned; thereby producing a mixture readily soluble in water, which mixture forms my binder in a compact and convenient form.

In the manufacture of construction material in road making and the like I add said binder to lime or limestone (calcium carbonate) in about the proportion of one of the binder (if dry) to two or more of lime or calcium carbonate. I do not consider it desirable to use more than fifteen parts of lime, or carbonate of lime, to one part of the binder, because the mixture would become so weak that the reactions would be too much retarded for practical working. This particular mixture is then ready for use, and can be transported in a dry state to the point where it is to be used, and there intermixed with the desired proportions of sand, gravel, rock, or other material which it is desired to bind. On the addition of water to the mass certain chemical reactions take place, resulting in the production of silicate of lime which binds all the materials into a compact mass of great strength and durability. Instead of adding lime or limestone to the mixture at the point of manufacture, crushed limestone (carbonate of lime) may be added at the point of use; thereby reducing transportation charges on the binding material.

The reactions which take place are as follows: The silicate of soda reacting on the acetate of lime, forms the binding material silicate of lime, and simultaneously produces acetate of soda.

The novel binder above described produces very superior practical results in that where it is used in road making, for example, the materials are bound firmly and compactly together and with a certain degree of elasticity which increases durability of the road-way; lessens shock and noise of traffic thereover; and such road-way is not detrimentally affected by atmospheric changes, nor by climatic changes of cold and heat. On account of the wearing and resilient qualities of the binder such road-way will be less liable to deterioration by the suction of pneumatic tires; and its surface also affords a better hold or tractive effect for vehicles and animals.

While I have found that the above mentioned proportions of silicate of soda and acetate of lime produce excellent results, the proportions may be varied according to the materials used, and the strength of the binder desired for various purposes.

What I claim is:

1. A composition for the purposes specified, comprising a filler bonded by a product of a mixture of acetate of lime and an alkaline silicate, substantially as described.

2. A binding material for the purpose described consisting of a mixture of a dry powdered alkaline silicate and dry powdered acetate of lime, substantially as described.

3. A composition for the purpose specified comprising a filler, and a mixture of a dry powdered alkaline silicate and dry powdered acetate of lime, substantially as described.

In testimony that I claim the foregoing as my own, I affix my signature in presence of two witnesses.

JAMES MILLAR NEIL.

Witnesses:
ARTHUR E. DOWELL,
JAMES R. MANSFIELD.

Copies of this patent may be obtained for five cents each, by addressing the "Commissioner of Patents, Washington, D. C."